Oct. 28, 1924.
T. H. SHEETS
POWER JACK
Filed Oct. 4, 1923
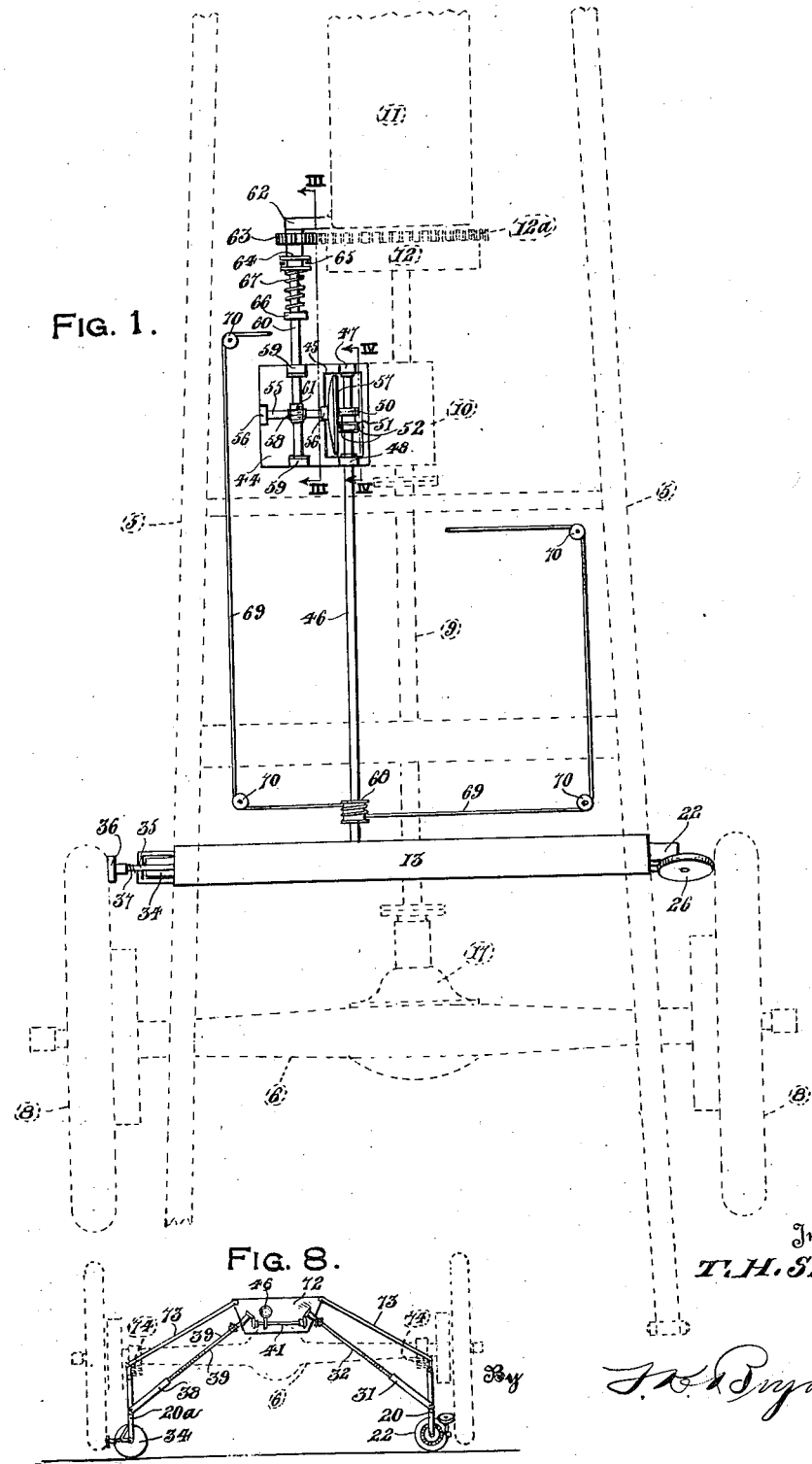

Oct. 28, 1924.
T. H. SHEETS
POWER JACK
Filed Oct. 4, 1923
1,513,282
2 Sheets-Sheet 2
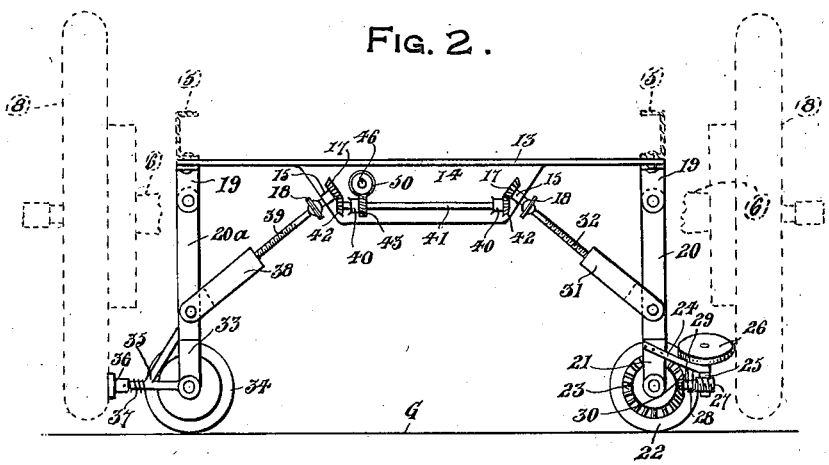
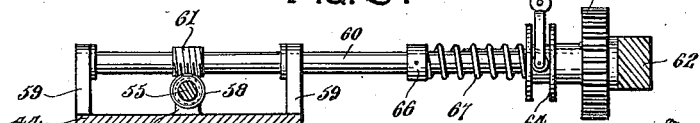
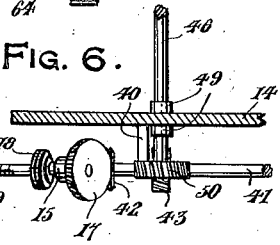
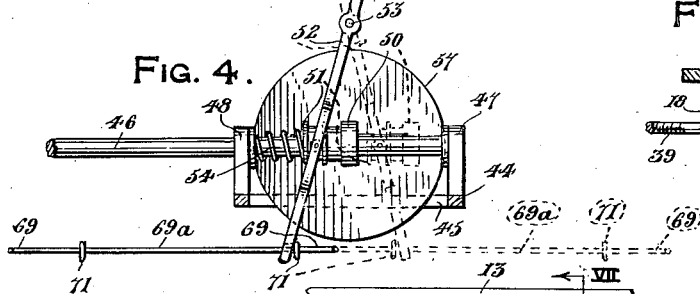
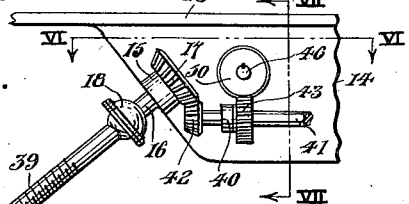
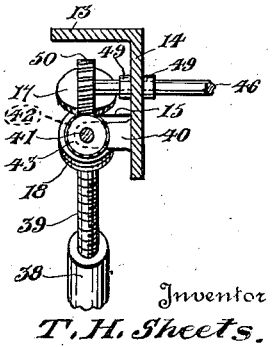
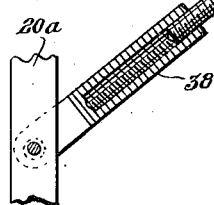
Inventor
T. H. Sheets.
By F. W. Bryant
Attorney Patented Oct. 28, 1924.

1,513,282

UNITED STATES PATENT OFFICE.

THOMAS H. SHEETS, OF SHINGLE, CALIFORNIA.

POWER JACK.

Application filed October 4, 1923. Serial No. 666,504.

*To all whom it may concern:*

Be it known that I, THOMAS H. SHEETS, a citizen of the United States of America, residing at Shingle, in the county of Eldorado and State of California, have invented certain new and useful Improvements in Power Jacks, of which the following is a specification.

This invention relates to improvements in automobile jacks and has particular reference to power operated types.

An important object of the invention is to provide a jack of the mentioned type which may be employed for tire repair or replacement work and is capable of being operated entirely from the driver's seat in the vehicle.

A further object of the invention is to provide a device which is adapted for moving one end of an automobile laterally in either direction for the purpose of turning the same around in a small space, for convenience in moving it in garages or show rooms, and for getting into and out of limited parking spaces in respect to curbs or the like.

A further object of the invention is to provide a jack which is capable of elevating the wheels at one end of an automobile off of the ground and taking motor power therefrom for moving the said vehicle laterally in either direction.

Other subjects and advantages of the invention will be apparent during the course of the following description.

In the accompanying drawings forming a part of this specification and in which like numerals are employed for designating like parts throughout the same, Figure 1 is a diagrammatical view of a fragmentary portion of an automobile running gear and power plant with my improved jack proper associated therewith, Figure 2 is a rear elevational view of the portion of my jack associated with the rear wheels of the vehicle, Figure 3 is a fragmentary view, partly in elevation and partly in section, taken upon line III—III of Figure 1, Figure 4 is a fragmentary elevational view, partly in section, taken upon line IV—IV of Figure 1, Figure 5 is a fragmentary portion of the device which is partly in elevation and partly in section and shows that portion of the device which operates directly upon the vehicle supporting portion of the same for causing the latter to operatively engage the ground or road-bed, Figure 6 is a fragmentary view taken upon line VI—VI of Figure 5, Figure 7 is a vertical sectional view, partly in elevation, taken upon line VII—VII of Figure 5, and Figure 8 is a rear elevational view of the portion of my jack associated with the rear wheels of the vehicle and illustrates a modification of the manner of mounting this portion over the showing in Fig. 2.

In the drawings, wherein for the purpose of illustration is shown a preferred embodiment of this invention, the numeral 5 designates the chassis or frame of an automobile which is provided with a rear axle 6, differential 7, rear wheels 8, drive shaft 9, transmission 10, power plant 11, and fly wheel 12.

Suitably secured to the chassis 5 and extending transversely thereof is a supporting bar 13 which is positioned substantially in transverse alignment with the forward edge of the rear wheels 8. This supporting bar 13 is provided with a depending, integrally formed flange 14, as shown in Figures 2, 5 and 7. Integrally formed with the opposite end edges of this flange 14 are journal bearings 15 which are adapted for rotatably supporting the stub-shafts 16 which are provided with a beveled gear 17 at their upper ends and the socket portions of a universal joint 18 at their lower ends.

Depending from the extreme ends of the supporting bar 13 are brackets 19 having bifurcated or yoke shaped lower ends which are pivotally connected to the standard 20, or 20ª, as shown. The standard 20 is provided with a yoke shaped lower end 21 to which is journaled the disk wheel 22 having the ring gear 23 formed on one side thereof. The standard 20 is provided with a laterally extending bracket portion 24 having journaled at its outer end the stub shaft 25 which is provided with a fixed, section wheel or disk 26 at its upper end and a worm gear 27 at its lower end. The laterally extending bracket 24 is provided with an extension 28 which supports a stub shaft 29 having a beveled gear 30 at one end that constantly meshes with the ring gear 23 formed on the disk wheel 22. The opposite end of the stub shaft 29 is provided with a worm gear, not shown, which is constantly in mesh with the worm gear 27 carried by the stub shaft 25.

The standard 20 is further provided, at a point substantially midway of its length, with an internally screw threaded tubular member 31 which is pivotally connected to the said standard and threadedly engages the screw 32 which is provided at its outer end with the ball portion of the universal joint 18.

The standard 20$^a$ is provided with a yoke shaped bottom end 33 which rotatably supports the disk wheel 34 in the manner illustrated, and is provided with a laterally extending bracket 35 having a head 36 slidably mounted on an extension of the said bracket and provided with a spring element 37 which normally forces the said head 36 outwardly upon the said extension. This standard 20$^a$ is pivotally connected to the internally screw threaded tubular member 38 having threadedly received therein the screw 39 which is provided at its outer end with the ball portion of the universal joint 18.

The depending flange 14 is provided with a pair of transversely spaced journal bearings 40 which are adapted for rotatably supporting the transversely extending shaft 41 which is provided at its outer end with beveled gears 42 which are constantly in mesh with the beveled gears 17. The transversely extending shaft 41 is further provided with a worm gear 43 which is positioned in proximity to one of the journal bearings 40.

Referring particularly to Figures 1, 3 and 4, there is shown a bracket plate 44 which is suitably secured to one side of the transmission housing 10 and is provided with a cut out portion 45 positioned in proximity to the said transmission housing. Extending longitudinally of the vehicle frame 5 is a driven shaft 46 which is supported at its forward end by the journal bearings 47 and 48 positioned upon opposite sides of the cut out portion 45. The rear end of the driven shaft 46 is journaled in the depending flange 14 carried by the transversely extending supporting bar 13 and is prevented from moving longitudinally by the collars 49 which are positioned upon opposite sides of the said flange 14. The rear end of this driven shaft 46 is provided with a gear 50 which constantly meshes with the gear 43 carried by the transversely extending shaft 41. The driven shaft 46 is provided with friction pinion 50' having formed integrally therewith the grooved collar 51 which is rotatably connected to a ring carried by the lever 52. The friction pinion 50' and integrally formed collar 51 are slidably keyed to the driven shaft 46 and are moved longitudinally upon the said shaft by the lever 52 which is pivoted at 53 to a suitable portion of the floor board of the automobile. There is further provided a spring element 54 which engages the grooved collar 51 at one end and the journal bearing 48 at the other end for normally positioning the friction pinion 50 as shown in Figure 4. It is to be understood that a second spiral spring may be positioned to encircle the driven shaft 46 and engage the friction pinion 50' at one end and the journal bearing 47 at the other end for aiding the spring 54 to normally retain the said friction pinion intermediate the journal bearings 47 and 48. In this showing, however, it is intended that the spring 54 accomplish this purpose.

Extending at right angles to the forward end of the driven shaft 46 is a stub shaft 55 which is supported by the journals 56 that are carried by the bracket plate 44, in the manner shown. Suitably keyed to this stub shaft 55 is a friction disk 57 which rotates within the cut out portion 45 formed in the bracket plate 44 and frictionally engages the friction pinion 50' which is intended to be normally positioned at the axis of the friction disk 57 and to be shifted laterally from this axis in either direction for forming a connection between the stub shaft 55 and the driven shaft 46 for rotation of the latter in either direction. The stub shaft 55 is provided with a gear 58 which is positioned substantially intermediate the journal bearings 56.

The bracket plate 44 is provided with a pair of spaced journal bearings 59 which are positioned in proximity to the front and rear edges of the said plate and are adapted for supporting one end of the drive shaft 60 which extends in parallelism with the drive shaft 9 of the automobile and the driven shaft 46. The drive shaft 60 is provided with a worm gear 61 that is constantly in mesh with the gear 58 carried by the stub shaft 55. The forward end of the drive shaft 60 is journaled in a suitable bracket 62 which extends outwardly from the side of the engine base 11 in the manner shown best in Figure 1. The forward end of the drive shaft 60 is provided with a pinion 63 formed integrally with the grooved ring 64 which is engaged by the roller carrying ends of the yoked lever 65. The drive shaft 60 is further provided with a fixed ring 66 which engages the rear end of the spring 67 that engages at its forward end the grooved ring 64. It is to be understood that this pinion 63 and ring 64 are slidably keyed to the drive shaft 60 and are moved longitudinally thereof by the yoke lever 65 for moving the pinion 63 into and out of mesh with the teeth 12$^a$ formed on the fly wheel 12. It will be seen that the spring element 67 normally forces the ring 64 and pinion 63 into the proper position for being driven by the fly wheel 12. This construction necessitates some means for retaining the yoke lever 65 in a suitable position for forcing the pinion 63 and ring 64 rearwardly against the tension of the spring 67 and for retaining them in this rearward position. The means employed for this purpose does not enter into the scope of the invention and is therefore not shown in detail.

The driven shaft 46 is provided with a sheave 68 which is encircled a desired number of times by the flexible cable 69 which engages smaller sheaves 70 suitably associated with the chassis of the automobile and adapted for leading the said flexible cable to allow a portion of the same, designated by the numeral 69a to extend longitudinally of the automobile frame. This section 69a is provided with the stops 71 which are adapted for engaging the lower end of the lever 52 which is employed for shifting the friction pinion 50' in respect to the friction disk 57.

The operation of the device is as follows: In Figures 1 and 2 the jack is shown in its operative position. It is to be understood, however, that the standards 20 and 20a with their associated elements are to be drawn upwardly underneath the body of the vehicle when the jack is not in operation. I will, therefore, start the description of the operation of this jack with the standards in their inoperative positions.

By shifting the lever 65 so that the pinion 63 is moved into mesh with the teeth 12a formed on the fly wheel 12, the drive shaft 60 will be rotated when the power plant 11 is in operation. It is to be understood that the transmission gearing 10 is properly positioned for disconnecting the rear axle 6 from the power plant 11. With the power plant 11 in operation, the stub shaft 56 will be rotated by the driving shaft 60 and the driven shaft 46 may be rotated in either direction at different speeds by shifting the friction pinion 50' laterally of the axis of the friction disk 57 by means of the lever 52. The rotation of this driven shaft 46 in one direction will rotate the transversely extending shaft 41 and the stub shaft 16 for rotating the right and left hand threaded screws 32 and 39 for moving these screws forwardly of the tubular members 31 and 38. This outward movement of the screws 32 and 39 will force the standards 20 and 20a downwardly into the vertical positions shown in Figure 2. When the standard 20 is moved into this position, the disk wheel 22 has been moved into engagement with the ground G and has elevated the right hand rear wheel 8. The friction wheel or disk 26 has also been moved into engagement with the side wall of this tire or wheel 8.

When the standard 20a is moved into its vertically extending position, the disk wheel 34 has been moved into engagement with the ground G and has elevated the left hand wheel 8 from the said ground. The resiliently mounted head 36 has also been moved into engagement with the side wall of the tire carried by the wheel 8 for acting as a brake for said wheel. It will now be seen that the rear of the vehicle has been elevated a sufficient amount to place the rear wheels 8 above the ground. The rotation of the driven shaft 46 will cause the flexible cable 69 to wind around the sheave 68 for moving the section 69a of this flexible cable in a suitable direction for causing one of the stop members 71 to engage the lower end of the lever 52 for shifting the friction pinion 50 to a position in alignment with the axis of the friction disk 57 when the standards with their disk wheels have been moved into their operative positions and will thereby prevent further rotation of the driven shaft 46. The lever 65 may then be operated for moving the pinion 63 out of mesh with the fly wheel 12 and the transmission gearing 10 may be suitably operated for driving the rear axle 6. It is to be understood that the proper operation of the transmission gearing 10 will cause the rear axle and rear wheels 8 to rotate in either direction. The resiliently mounted head 36 will act as a brake for preventing the left hand rear wheel 8 from rotating and differential gearing will allow the right hand rear wheel 8 to rotate in the desired direction. Due to the engagement of the friction wheel 26 with the wall of the wheel 8, the disk wheel 22 will be rotated for shifting the rear end of the vehicle laterally in either direction depending upon the direction of rotation of the rear wheel 8. After the rear end of the vehicle has been shifted as far as desired, the transmission gearing 10 may be operated for disconnecting the drive to the rear axle 6. The connections and directions of rotation of the various shafts may be reversed for moving the standards 20 and 20a upwardly into their inoperative positions with the disk wheels 22 and 34 out of engagement with the ground G, thereby allowing the rear vehicle wheels 8 to again engage the ground.

In the modification shown in Fig. 8, a transversely extending plate 72 is connected, by the diverging supporting rods 73, to the leaf springs 74 adjacent the rear axle 6. The various elements associated with the flange 14, shown in Figs. 2, 5, 6 and 7, are similarly associated with the plate 72 and the elements carried by the ends of the supporting bar 13, shown in Figs. 1 and 2, are to be carried by the outer ends of the supporting rods 73. This modification will necessitate the provision of a universal joint in the driven shaft 46 to allow for the relative movement between the chassis and the rear axle.

It is to be understood that I do not desire to limit myself to the associating of this jack construction to the rear wheels of a vehicle for the front wheels may be elevated with the same construction and should the vehicle be of a type wherein the front wheels are driven, the front end of the vehicle could be shifted laterally with the rear wheels.

It is to be understood that the form of this invention herein shown and described is to be taken as a preferred example of the same, and that various changes in the shape, size and arrangement of parts may be resorted to without departing from the spirit of the invention or the scope of the subjoined claims.

Having thus described the invention, what I claim is:

1. In a device of the class described, the combination with an automobile having a power plant and a fly wheel, of means including ground engaging wheels carried by the frame of said automobile for raising and lowering the rear wheels of the latter in respect to the ground, means for connecting the first mentioned means with the fly wheel of said power plant for operating the same, and means for driving one of said ground engaging wheels from one of the rear wheels of the automobile for moving the rear end of the latter laterally in either direction.

2. In a device of the class described, the combination with an automobile, of standards pivotally connected to the frame thereof, a wheel carried by each standard, means for pivoting said standards for moving said wheels into and out of engagement with the ground for raising one end of said automobile and means for driving one of said ground engaging wheels from one of the rear wheels of the automobile for moving the rear end of the latter laterally in either direction.

3. In a device of the class described, the combination with an automobile having a power plant, a fly wheel, a transmission element, a differential element, and ground engaging wheels operatively connected to said differential, of a driven shaft and a drive shaft, means for operatively connecting and disconnecting said drive shaft with said fly wheel, means for connecting said driven shaft with said drive shaft for rotating the former in opposite directions, standards pivotally connected to the frame of said automobile, a wheel carried by each standard, a brake element carried by one of said standards for engaging one rear wheel of said automobile for preventing rotation of the same, means carried by the second standard for operatively engaging the second rear wheel for rotating the wheel carried by that standard, means for causing said driven shaft to pivot said standards for moving the latter into their operative or inoperative positions with the brake element engaging one rear wheel of the automobile and the standard wheel driving means engaging the second rear wheel of the automobile in such a manner that when the transmission gearing is operated for driving the rear wheels of the automobile, the standard carried wheel will be rotated for shifting the automobile laterally in either direction.

In testimony whereof I affix my signature.

THOMAS H. SHEETS.